United States Patent
Keegan et al.

(10) Patent No.: US 9,211,531 B2
(45) Date of Patent: Dec. 15, 2015

(54) METHODS FOR COATING CERAMIC CATALYST SUPPORTS WITH BASE COATINGS AND CERAMIC CATALYST SUPPORTS HAVING BASE COATINGS

(75) Inventors: Kimberly M Keegan, Corning, NY (US); Paul John Shustack, Elmira, NY (US)

(73) Assignee: Corning Incorporated, Corning, NY (US)

(*) Notice: Subject to any disclaimer, the term of this patent is extended or adjusted under 35 U.S.C. 154(b) by 331 days.

(21) Appl. No.: 13/075,296

(22) Filed: Mar. 30, 2011

(65) Prior Publication Data

US 2012/0252664 A1 Oct. 4, 2012

(51) Int. Cl.
*B01J 32/00* (2006.01)
*B01J 31/06* (2006.01)
*B01J 37/02* (2006.01)

(52) U.S. Cl.
CPC .............. *B01J 31/06* (2013.01); *B01J 37/0219* (2013.01)

(58) Field of Classification Search
CPC ........ B01J 31/06; B01J 32/00; B01J 37/0217; B01J 37/0219; B01J 37/024; C08L 29/04; C04B 38/0006
USPC .................................................. 502/159, 439
See application file for complete search history.

(56) References Cited

U.S. PATENT DOCUMENTS

| | | | | |
|---|---|---|---|---|
| 4,483,940 | A | 11/1984 | Ono et al. ..................... | 502/159 |
| 6,420,020 | B1 | 7/2002 | Yamazaki et al. ............. | 428/336 |
| 7,122,612 | B2 | 10/2006 | Tao et al. ..................... | 526/317.1 |
| 7,151,131 | B2 * | 12/2006 | Kenworthy et al. .......... | 524/555 |
| 7,166,555 | B2 | 1/2007 | Shustack et al. .............. | 502/159 |
| 2007/0098914 | A1 * | 5/2007 | Ingram-Ogunwumi et al. ............................ | 427/487 |

FOREIGN PATENT DOCUMENTS

| | | | |
|---|---|---|---|
| JP | 52-136897 | 11/1977 | ............... B01J 23/40 |
| WO | WO 2006/088699 | 8/2006 | ............... B01J 31/00 |

OTHER PUBLICATIONS

Barbari et al, "Characterization and mechanical support of asymmetric hydrogel membranes based on the interfacial cross-linking of poly(vinyl alcohol) with toluene diisocyanate", Journal of Membrane Science, vol. 111, Jan. 1, 1996, pp. 115-122.
Database WPI, Week 198327, Thomson Scientific, London, GB; AN 1983-702895, XP-002524555, & JP 58 089950 A (Nippon Shokubai Kagaku Kogyo Co Ltd) May 28, 1983, abstract.
"Electrokinetic behaviour and dispersion characteristics of ceramic powders with cationic and anionic polyelectrolytes"; Pradip et al; Bull. Materials Science; vol. 17, No. 6; Nov. 1994; p. 911-920.
"Lime-alumina-silica vitreous ceramic processing incorporating wollastonite"; Bryden et al; British Ceramic Transactions, 1999; vol. 98, No. 3; p. 127-132.
"The preparation for sintered body of CeO2 based complex oxide in low temperature solid oxide fuel cells using colloidal surface chemistry"; Hwang et al; Ceramic Materials and Components for Engines; p. 605-610, 2001.
"Aqueous milling and near net shape forming of SiAion Ceramics"; Bendeich et al; Australian Nuclear Science and Technology Organization, 1996.
"Wet processing alumina—Wollastonite suspensions using a catonic polyelectrolyte"; Journal of Materials Science Letters 17 (1998); p. 895-897.
"Slurry chemistry control to produce easily redispersible ceramic powder compacts"; Moon et al; Journal of American Ceramics Society 83 (10); p. 2401-2408 (2000).
"Effect of particle dispersion on microstructure and strength of reaction-bonded silicon carbide"; Paik et al; Materials Science and Engineering A334 (2002) p. 267-274.

\* cited by examiner

*Primary Examiner* — Ling Choi
*Assistant Examiner* — Marie Reddick
(74) *Attorney, Agent, or Firm* — Charles A. Greene

(57) ABSTRACT

The disclosure relates to methods for coating ceramic catalyst supports with a base coating, said method comprising, in part, providing an aqueous mixture comprising at least one polyvinyl alcohol homopolymer and at least one blocked isocyanate crosslinker, and to ceramic catalyst supports having a base coating comprising at least one polyvinyl alcohol homopolymer and at least one blocked isocyanate crosslinker.

20 Claims, No Drawings

METHODS FOR COATING CERAMIC CATALYST SUPPORTS WITH BASE COATINGS AND CERAMIC CATALYST SUPPORTS HAVING BASE COATINGS

FIELD OF THE DISCLOSURE

Disclosed herein are methods for coating ceramic catalyst supports with a base coating, said methods comprising providing an aqueous mixture comprising at least one polyvinyl alcohol homopolymer and at least one blocked isocyanate crosslinker; applying a coating of the aqueous mixture to a ceramic catalyst support; and drying and curing the coating. The disclosure further relates to ceramic catalyst supports having a base coating, wherein the base coating comprises at least one polyvinyl alcohol homopolymer and at least one blocked isocyanate crosslinker.

BACKGROUND

Ceramic bodies, such as aluminum titanate and cordierite ceramics, may be used in a variety of applications. For example, such bodies are viable for use in the severe conditions of exhaust gas environments, including, for example, as catalytic converters and as diesel particulate filters. Among the many pollutants in the exhaust gases filtered in these applications are, for example, hydrocarbons and oxygen-containing compounds, the latter including, for example, nitrogen oxides ($NO_x$) and carbon monoxide (CO), and carbon-based soot and particulate matter.

Ceramic bodies exhibit high thermal shock resistance, enabling them to endure the wide temperature variations encountered in their application, and they also exhibit other advantageous properties for diesel particulate filter applications, such as, for example, high porosity, low coefficient of thermal expansion (CTE), resistance to ash reaction, and a modulus of rupture (MOR) adequate for the intended application.

With engine management schemes becoming more and more sophisticated, there exists a need for the application of a variety of catalytic coatings on ceramic bodies or ceramic catalyst supports to control hydrocarbon and/or nitrogen oxide emissions. The adverse effect of catalyst coating processes on the thermal properties of ceramic bodies or catalyst supports, such as cellular ceramics, however, are well-known. For example, one problem that may be encountered is that oxide constituents of the catalyst or catalyst support coatings, such as alumina, will penetrate into the microstructure of the ceramic supports during the coating and curing processes, filling the microstructure in a manner that may increase the thermal expansion coefficient of the catalyzed ceramic and thereby reduce the thermal shock resistance.

Thus, there exists a need to improve the design and performance of ceramic catalyst supports and methods of making such ceramic catalyst supports, for example to provide catalyst loading sufficient for effective catalytic treatment of exhaust streams while maintaining high gas permeability and low coefficient of thermal expansion of the catalyzed filter.

The inventors have now discovered novel methods for coating ceramic catalyst supports with a base coating comprising at least one polyvinyl alcohol homopolymer and at least one blocked isocyanate crosslinker, and catalyst supports having a base coating comprising at least one polyvinyl alcohol homopolymer and at least one blocked isocyanate crosslinker. In various embodiments, the coated ceramic catalyst supports of the disclosure may provide catalyst loading sufficient for effective catalytic treatment, while not adversely affecting the properties of the ceramic support.

SUMMARY

In accordance with the detailed description and various exemplary embodiments described herein, the disclosure relates to methods for coating ceramic catalyst supports with a base coating, said methods comprising providing an aqueous mixture comprising at least one polyvinyl alcohol homopolymer and at least one blocked isocyanate crosslinker; applying a coating of the aqueous mixture to a ceramic catalyst support; and drying and curing the coating.

The disclosure further relates to catalyst supports having a base coating, wherein the base coating comprises at least one polyvinyl alcohol homopolymer and at least one blocked isocyanate crosslinker.

DETAILED DESCRIPTION

It is to be understood that both the foregoing general description and the following detailed description are exemplary and explanatory only, and are not restrictive of the invention as claimed. Other embodiments of the invention will be apparent to those skilled in the art from consideration of the specification and practice of the invention disclosed herein. It is intended that the specification and examples be considered as exemplary only, with a true scope and spirit of the invention being indicated by the claims.

As used herein, the use of "the," "a," or "an" means "at least one," and should not be limited to "only one" unless explicitly indicated to the contrary. Thus, for example, the use of "the polyvinyl alcohol homopolymer" or "a polyvinyl alcohol homopolymer" is intended to mean "at least one polyvinyl alcohol homopolymer."

The disclosure relates, in various embodiments, to methods for coating a ceramic catalyst support with a base coating, said methods comprising providing an aqueous mixture comprising at least one polyvinyl alcohol homopolymer and at least one blocked isocyanate crosslinker; applying a coating of the aqueous mixture to a ceramic catalyst support; and drying and curing the coating.

As used herein, the term "ceramic catalyst support," and variations thereof, is intended to mean ceramic bodies for coating with catalytic material. Ceramic catalyst supports include, but are not limited to, those comprised of cordierite, aluminum titanate composites, mullite, alkali and alkaline-earth feldspar phases, and silicon carbide. In at least one embodiment, the ceramic catalyst support may be comprised of at least one of aluminum titanate, cordierite, or silicon carbide. The terms "ceramic catalyst supports" and "ceramic bodies" may be used interchangeably herein.

In at least one embodiment, the ceramic catalyst supports may be porous, such as found in ceramic honeycombs structures. In various embodiments, the ceramic catalyst supports may have a porosity in the range of from about 30% to about 70%, such as, for example, about 40% to 60%, or 40% to 50%.

As used herein, the term "base coating," and variations thereof, is intended to mean a layer of material over the ceramic catalyst support. In various embodiments, the base coating may be in direct contact with, or applied directly to, the ceramic catalyst support. In further embodiments, the base coating may coat substantially all surfaces of the ceramic catalyst support. In other embodiments, the base coating may coat a portion of the ceramic catalyst support, such as the end portion of the ceramic support when plugs are utilized.

In additional embodiments, the base coating may be a passivating coating, meaning that it may be compatible with a secondary coating, such as a catalyst coating or washcoating, and may, in further embodiments, also prevent unacceptable degradation of the ceramic catalyst support. For example, in at least one embodiment, the ceramic catalyst support may be porous and the base coating may be a passivating coating, thereby preventing unwanted penetration of a secondary coating material into the fine pore structure of the support.

In accordance with various disclosed embodiments, an aqueous mixture comprising at least one polyvinyl alcohol homopolymer and at least one blocked isocyanate crosslinker is provided. In various embodiments, providing an aqueous mixture may comprise combining the at least one polyvinyl alcohol homopolymer and the at least one blocked isocyanate crosslinker.

In various exemplary embodiments, the polyvinyl alcohol homopolymer for use in the aqueous mixture may be dissolved in water or may be provided already dissolved in water. In at least one embodiment, the polyvinyl alcohol homopolymer may be provided already dissolved in water and may not need pH adjusting. In various embodiments, the aqueous solution of polyvinyl alcohol homopolymer may comprise from 2 to 50% solids, such as from 5 to 30% solids, from 10 to 25% solids or from 20 to 25% solids. The aqueous solution of polyvinyl alcohol homopolymer may also have a viscosity ranging from 5 to 100,000 cPs, such as from 5 to 50,000 cPs, from 10 to 20,000 cPs, or from 20 to 10,000 cPs.

Non-limiting examples of polyvinyl alcohol homopolymers for use in the aqueous mixtures useful herein include aqueous solutions of polyvinyl alcohol homopolymer marketed under the trade name Celvol by Sekisui Specialty Chemicals America of Tarragona, Spain, for example Celvol 05-540, 08-125, 09-325, 09-523, 21-205, and 24-203, and those marketed under the trade name Elvanol by DuPont Corporation of Wilmington, Del., for example Elvanol 20-25 L3, 51-03 L24, 51-04 L24, 52-22 L10, and 70-03 L12. It is within the ability of one skilled in the art to select a polyvinyl alcohol homopolymer for use in the aqueous mixture based on desired characteristics, such as, but not limited to, molecular weight, hydrolysis level, viscosity, and solids level when the homopolymer is in solution.

In various embodiments, the amount of polyvinyl alcohol homopolymer may range from about 50% to about 99% of total polymer solids in the aqueous mixture, for example from about 65% to about 98%, or about 80% to about 97%.

In various embodiments, the blocked isocyanate crosslinker for use in the aqueous mixture may be soluble or dispersible in water. In further embodiments, the blocked isocyanate crosslinker may be provided already dissolved in water or dispersed in water.

Non-limiting examples of blocked isocyanate crosslinker for use in the aqueous mixture include, for example, blocked isocyanate crosslinkers dispersed or dissolved in water marketed under the trade name BI 7986 and BI 7987 by Baxenden Chemicals Limited of Lancashire, England; Baybond 116 and Bayhydur BL 116, BL 5235, BL 5335, BL2871 XP, BL 5140, BL XP 2706, LP MXH 1241-B, LP MXH 1274-A, and VP LS 2310 by Bayer Corporation of Pittsburg, Pa.; NK Assist V-2 by Nicca USA Incorporated of Fountain Inn, S.C.; Ecco Crosslinker AP-900, AP-906, and MT356 by Eastern Color & Chemical Company of Providence, R.I.; Takanate WB 920 and ATH400 by Mitsui Takeda Chemicals Incorporated of Tokyo, Japan; and Acuanate 200 and 210 by Nippon Polyurethane Kogyo Limited of Tokyo, Japan. It is within the ability of one skilled in the art to select a blocked isocyanate crosslinker for use in the aqueous mixture based on characteristics including, but not limited to, molecular weight, isocyanate type, blocking agent, and de-blocking temperature. In at least one embodiment, the blocked isocyanate crosslinker may be selected such that it may be added to the aqueous mixture comprising a polyvinyl alcohol homopolymer, and not crosslink until after application to the ceramic catalyst support.

In various embodiments, the amount of blocked isocyanate crosslinker may range from about 1% to about 50% of total polymer solids in the aqueous mixture, such as about 2% to about 35%, or about 3% to about 20%.

In at least one exemplary embodiment, aqueous mixtures useful according to the disclosure may be based on mixtures of an aqueous solution of polyvinyl alcohol homopolymer and an aqueous dispersion or aqueous solution of blocked isocyanate crosslinker.

In at least one embodiment, the aqueous mixture may further comprise at least one additional component, such as, for example, an anti-foaming agent, coalescing agent, plasticizer, surfactant, dispersing agent, catalyst, or pH adjuster. In at least one embodiment, the at least one additional component may be an anti-foaming agent. A non-limiting example of an anti-foaming agent is that marketed as Anitfoam 116 by Harcros Chemicals Incorporated of Kansas City, Kans. In further embodiments of the disclosed methods, the aqueous mixtures may be substantially free of at least one of sodium, calcium, potassium, silicon, fluorine, phosphorous, chlorine, bromine, iron, and sulfur. As used herein, the term "substantially free," and variations thereof, means that the amount of one or more of these elements, if present, does not produce an adverse effect on the ceramic catalyst support and/or secondary coating, and/or is not detrimental to the manufacturing process or environment. By way of example only, the aqueous mixture may contain less than about 1000 ppm of at least one of the elements, such as less than about 800 ppm, less than about 600 ppm, or less than about 400 ppm.

In various embodiments, the aqueous mixture may have a solids level ranging from about 1 wt % to about 50 wt %, such as about 2 wt % to about 40 wt %, about 3 wt % to about 30 wt %, and about 5 wt % to about 20 wt %. In further embodiments, the aqueous mixture may have a viscosity ranging from about 10 cPs to about 1000 cPs, such as from about 10 cPs to about 100 cPs.

In at least one exemplary embodiment of the disclosed methods, the aqueous mixture may allow for a one-part composition to form the base coating. Such an embodiment may alleviate the need for dispensing and mixing the proper ratios of the reactive materials (stoichiometry), as may be necessary for 2-part coating compositions. For example, the chemistry involving the reaction of hydroxyl functional materials (alcohols) with isocyanate functional materials to form urethanes generally may involve a 2-part system wherein part A is the hydroxyl functional material and part B is the isocyanate functional material. In such a system, parts A and B must be kept separate and then, when needed, are blended together in the proper stoichiometric ratios. In at least this embodiment of the methods of the disclosure, there may be no need for a 2-part system, and thus, there may be no concern about stoichiometric ratios or the proper blending of parts A and B together.

In various embodiments of the disclosure, the aqueous mixture may be stable, e.g., have a shelf-life wherein the mixture remains substantially unreacted and/or has little to no increase in viscosity over time. For example, the mixture may be stable or have a shelf-life of at least 1 month, such as at least 3 months, at least 6 months, at least 9 months, or at least 1 year.

The aqueous mixture may be applied to the ceramic catalyst support by dipping and/or vacuum as set forth in U.S. Pat. No. 7,166,555, which is incorporated herein by reference, or by any other method known to those of skill in the art.

In various embodiments, the methods may further comprise removing excess aqueous mixture from the ceramic catalyst support, for example by pouring or draining off the material and/or blowing out the ceramic catalyst support with high pressure air or vacuum.

The disclosed methods further comprise drying and curing the coating. In various embodiments, the drying and curing may be performed sequentially or simultaneously, and may use the same or different techniques. For example, the coated ceramics catalyst supports may be dried and/or cured using an oven, such as a forced air oven. The coated ceramic catalyst supports may also be dried using microwave or dielectric driers. In at least one exemplary embodiment, the coated ceramic catalyst may be dried using a microwave drier. In a further exemplary embodiment, the coated ceramic catalyst may be dried and cured in a forced air oven, for example at about 125° C. for about 24 hours. In another embodiment, the coated ceramic catalyst may be cured using a forced air oven. In a further embodiment, the coated ceramic catalyst may be dried using a microwave drier and then cured using a forced air oven.

In various embodiments, a secondary coating, such as a catalyst coating or washcoating may then be applied over the base coating. Non-limiting examples of such coatings include, but are not limited to, high surface area alumina materials, such as Nyacol AL-20 marketed by Nano Technologies, Incorporated, of Ashland, Mass. or Siralox 1.5/100 Si doped material marketed by Sasol Germany GmbH, of Hamburg, Germany; or zeolite material, such as ZSM-5 materials marketed by Zeolyst International, Conshohocken, Pa.

The disclosure also relates to ceramic catalyst supports having a base coating, wherein the base coating comprises at least one polyvinyl alcohol homopolymer and at least one blocked isocyanate crosslinker.

As described above, the term "ceramic catalyst support," and variations thereof, is intended to mean ceramic bodies for coating with catalytic material, and include, but are not limited to, those comprised of cordierite, aluminum titanate composites, mullite, alkali and alkaline-earth feldspar phases, and silicon carbide. In at least one embodiment, the ceramic catalyst support may be comprised of at least one of aluminum titanate, cordierite, or silicon carbide.

As also described above, in various embodiments, the ceramic catalyst supports may be porous, such honeycomb structures, and may have a porosity in the range of from about 30% to about 70%, such as, for example about 40% to about 60%, or about 40% to about 50%.

The base coating on the ceramic catalyst support is also in accordance with that described above, and is intended to mean a layer of material over the ceramic catalyst support. In various embodiments, the base coating may optionally be in direct contact with the ceramic catalyst support. In further embodiments, the base coating may coat substantially all surfaces of the ceramic catalyst support. In other embodiments, the base coating may coat a portion of the ceramic catalyst support, such as, for example, the end portion of the ceramic support when plugs are utilized.

In further embodiments, the base coating may be a passivating coating, meaning that it may be compatible with a secondary coating, such as a catalyst coating or wash-coating, and may also prevent unacceptable degradation of the ceramic catalyst support. For example, in at least one embodiment, the ceramic catalyst support may be porous and the base coating may be a passivating coating, thereby preventing unwanted penetration of a secondary coating material into the fine pore structure of the support.

Non-limiting examples of polyvinyl alcohol homopolymers for use in the base coating are set forth above. It is within the ability of one skilled in the art to select a polyvinyl alcohol homopolymer for use in the base coating, based on desired characteristics including, but not limited to, molecular weight, hydrolysis level, viscosity and solids level when the homopolymer is in solution.

In various embodiments, the amount of polyvinyl alcohol homopolymer in the base coating may range from about 50 wt % to about 99 wt %, for example from about 65 wt % to about 98 wt %, or about 80 wt % to about 97 wt %.

Non-limiting examples of blocked isocyanate crosslinker for use in the base coating are set forth above. It is within the ability of one skilled in the art to select a blocked isocyanate crosslinker for use in the base coating based on characteristics including, but not limited to, molecular weight, isocyanate type, blocking agent, and de-blocking temperature.

In various embodiments, the amount of blocked isocyanate crosslinker in the base coating may range from about 1 wt % to about 50 wt %, such as about 2 wt % to about 35 wt %, or about 3 wt % to about 20 wt %.

In further embodiments of the disclosed ceramic catalyst support, the base coating may be substantially free of at least one of sodium, calcium, potassium, silicon, fluorine, phosphorous, chlorine, bromine, iron, and sulfur.

In at least some embodiments, the disclosed methods and ceramic catalyst supports may be less costly than methods and products known in the art due to material selection and process simplicity. For example, the materials in the aqueous mixture and/or base coating may be less costly than those used in the art. More specifically, the use of polyvinyl alcohol homopolymers may be less costly than using co-polymers, such as those described in U.S. Pat. No. 7,166,555, as the raw materials may be less costly and fewer processing steps may be required in manufacturing the final material. As another example, the aqueous mixture of the disclosed methods may be less expensive to make than other base coating mixtures known in the art. More specifically, methods such as those disclosed in U.S. Pat. No. 7,166,555 may require dissolution of the copolymer by heating the mixture while controlling evaporation, which may take several hours and specialized equipment, and then neutralizing the solution by adding concentrated nitric acid; whereas, the polyvinyl alcohol homopolymers of the disclosed method may be commercially sold in aqueous solution, thereby eliminating two process steps.

In various embodiments of the disclosure, the base coatings on the ceramic catalyst supports may not exhibit negative effects after exposure to low pH solutions, including after extreme conditions such as soaking for about 24 hours in pH=1.5 acetic acid solutions. In other embodiments, the base coatings of the disclosure may exhibit reduced negative effects after exposure to low pH solutions as compared to base coatings not within the scope of the disclosure. In further embodiments, the base coatings of the disclosure may yet meet washcoat or catalyst loading, backpressure, and coefficient of thermal expansion specifications required of diesel filters.

In various embodiments of the disclosure, the base coating may be substantially inert in low pH solutions, such as some catalyst coatings and wash coatings and may, thereby, avoid negative effects on catalyst and wash coating applications and efficacy. For example, in at least one embodiment, less than about 20 wt % of the base coating may be extracted from the ceramic catalyst support after soaking the ceramic catalyst support in about pH 1.5 acetic acid solution for about 24 hours, and in further embodiments, less than about 15 wt % or less than about 10 wt %, of the base coating may be extracted.

In various other embodiments of the disclosure, the base coating may be substantially resistant to swelling and/or wrinkling in low pH solutions, such as some catalyst coating and wash coatings and may, thereby, avoid or reduce physical damage, such as cracking, to the ceramic catalyst support. For example, in at least one embodiment, the base coating may substantially resist wrinkling or cracking after soaking the ceramic catalyst support in pH 1.5 acetic acid solution for at least 1 hour.

Unless otherwise indicated, all numbers used in the specification and claims are to be understood as being modified in all instances by the term "about," whether or not so stated. It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

Other embodiments of the invention will be apparent to those skilled in the art from consideration of the specification and practice of the invention disclosed herein. It is intended that the specification and examples be considered as exemplary only, with a true scope and spirit of the invention being indicated by the claims.

EXAMPLES

Example 1

An aqueous mixture comprising a polyvinyl alcohol homopolymer was prepared by mixing 7.5 g Celvol 24-203 and 7.5 g deionized water. The resulting initial composition contained 1.8 g or 12 wt % polyvinyl alcohol homopolymer solids and had a viscosity of 47 cPs.

Next, a blocked isocyanate crosslinker was added to make an aqueous mixture for coating a ceramic catalyst support. The aqueous mixture composition is set forth in Table 1 below. The resulting aqueous mixture comprises 12.73 wt % solids and a viscosity of 45 cPs.

TABLE 1

Aqueous Mixture Composition

| Ingredient | Grams | Wt % | Grams of Solids | Solids % |
|---|---|---|---|---|
| Celvol 24-203 | 150.00 | 48.52 | 36.60 | 93.00 |
| DI Water | 150.00 | 48.52 | | |
| NK Assist V-2 | 9.15 | 2.96 | 2.74 | 7.00 |
| Total | 309.15 | 100.00 | 39.34 | 100.00 |

The aqueous composition was applied to a 2"×6" aluminum titanate cellular ceramic catalyst support by the method set forth in U.S. Pat. No. 7,166,555, col. 6, lines 3-14, and the coated support was dried and cured in an oven at 125° C. for 14 hours.

The resulting base coated ceramic catalyst support was analyzed and the results are set forth in Table 2 below.

TABLE 2

Analysis of Base Coated Ceramic Catalyst Support

| Bare Support Weight (g) | Support Weight With Aqueous Mixture Applied (g) | Aqueous Mixture Pickup (g) | Coated Support Weight After Drying And Curing (g) | Coating Pickup (g) | Wt % Coating Pickup |
|---|---|---|---|---|---|
| 227.93 | 284.12 | 56.19 | 234.78 | 6.85 | 3.01 |

The coated ceramic catalyst support was then soaked in pH=1.5 acetic acid solution. After one hour, the filter had not changed, but after two hours there was slight skin wrinkling. After 24 hours of soaking, the amount of extractables was 3.36 wt % of the deposited base coating.

Comparative Example 1

As a comparison, a ceramic catalyst support having a pre-coating prepared in accordance with U.S. Pat. No. 7,166,555, and also subjected to a soak in pH=1.5 acetic acid solution wrinkled more quickly, in less than one hour, and to a greater extent. Additionally, after soaking for 24 hours, the amount of extractables was much higher at 25 wt % of the deposited pre-coating.

Examples 2-8

The seven compositions set forth in Table 3 were prepared and applied to 2"×6" aluminum titanate cellular ceramic catalyst supports in the same manner described in Example 1.

The resulting base coated ceramic supports were analyzed and the results are set forth in Table 3 below. As seen in Table 3, the percent extractables of the cured base coated ceramic catalyst supports after soaking in pH=1.5 acetic acid solution for 24 hours are considerably less than 25 wt %. The appearance of the soaked supports were also much better than for the support prepared in accordance with U.S. Pat. No. 7,166,555 and described in Comparative Example 1.

TABLE 3

Aqueous Mixture Compositions and Base Coating Analysis

| Ingredient | Example 2 (wt %) | Example 3 (wt %) | Example 4 (wt %) | Example 5 (wt %) | Example 6 (wt %) | Example 7 (wt %) | Example 8 (wt %) |
|---|---|---|---|---|---|---|---|
| Celvol 24-203 | 43.82 | 42.68 | 40.57 | 41.60 | 42.13 | 43.24 | 42.71 |
| DI Water | 53.46 | 52.06 | 49.48 | 50.75 | 51.40 | 52.75 | 51.48 |
| NK Assist V-2 | 2.67 | 5.21 | 9.90 | 7.60 | 6.42 | 3.96 | 5.76 |
| Harcros Antifoam 116 | 0.05 | 0.05 | 0.05 | 0.05 | 0.05 | 0.05 | 0.05 |
| Viscosity (cPs) | 33.2 | | 31.2 | 33.2 | 33.2 | 33.6 | 34.4 |

TABLE 3-continued

Aqueous Mixture Compositions and Base Coating Analysis

| Ingredient | Example 2 (wt %) | Example 3 (wt %) | Example 4 (wt %) | Example 5 (wt %) | Example 6 (wt %) | Example 7 (wt %) | Example 8 (wt %) |
|---|---|---|---|---|---|---|---|
| % Extractables | 3.25 | 3.02 | 2.92 | 5.08 | 4.17 | 10.09 | 6.82 |

The ceramic catalyst supports having base coatings of Examples 2 and 3 were then washcoated with Nyacol AL20. Two additional comparative example were prepared. The first, noted as "Bare Support," was a bare 2"×6" aluminum titanate cellular ceramic catalyst support. The second, noted as "Comparative," was prepared by washcoating a bare 2"×6" aluminum titanate cellular ceramic catalyst support with Nyacol AL20 as well. Thus, the Comparative Example lacks a base coating.

The four supports were analyzed, and the data appears in Table 4 below. As seen in Table 4, the AL20 washcoat loading, soot loaded backpressure, and backpressure ratio of Examples 2 and 3 are similar to the Comparative example, i.e., an AL20 washcoated filter with no base coating. As can also be seen from Table 4, the CTE of Examples 2 and 3 is much improved (i.e., lower) than for the Comparative example, i.e., an AL20 washcoated filter with no base coating.

TABLE 4

Analysis of Washcoated Ceramic Catalyst Supports of Examples 2 & 3

| Property | Example 2 | Example 3 | Bare Support | Comparative |
|---|---|---|---|---|
| AL20 washcoat loading (g/L) | 42.1 | 44.1 | *** | 48.8 |
| Soot Loaded Backpressure (kPa) | 5.31 | 5.84 | 4.09 | 5.36 |
| Backpressure ratio | 1.30X | 1.43X | *** | 1.32X |
| CTE at 1000° C. (×10$^{-7}$/° C.) | 24.8 | 17.5 | 7.6 | 41.6 |
| CTE at 800° C. (×10$^{-7}$/° C.) | 20.2 | 13.2 | 3.6 | 35.7 |

What is claimed is:

1. A method for coating a ceramic catalyst support with a base coating, said method comprising:
    providing a base coating comprising an aqueous mixture comprising at least one polyvinyl alcohol homopolymer and at least one blocked isocyanate crosslinker chosen from blocked isocyanate crosslinkers capable of crosslinking the polyvinyl alcohol homopolymer;
    applying a coating of the aqueous mixture to a ceramic catalyst support; and
    drying and curing the coating.

2. The method of claim 1, wherein providing a base coating comprising an aqueous mixture comprises combining the at least one polyvinyl alcohol homopolymer and the at least one blocked isocyanate crosslinker.

3. The method of claim 2, wherein the at least one polyvinyl alcohol homopolymer is in an aqueous solution.

4. The method of claim 2, wherein the at least one blocked isocyanate crosslinker is in the form of an aqueous dispersion or an aqueous solution.

5. The method of claim 1, wherein the amount of the at least one polyvinyl alcohol homopolymer ranges from about 50 wt. % to about 99 wt. % of total polymer solids in the aqueous mixture.

6. The method of claim 1, wherein the amount of the at least one blocked isocyanate crosslinker ranges from about 1 wt. % to about 50 wt. % of total polymer solids in the aqueous mixture.

7. The method of claim 1, wherein the aqueous mixture has a solids level ranging from 5 wt. % to 20 wt. %.

8. The method of claim 1, wherein the aqueous mixture has a viscosity ranging from 10 cPs to 1000 cPs.

9. The method of claim 1, wherein the aqueous mixture is stable for at least 3 months.

10. The method of claim 1, wherein the base coating is a passivating coating.

11. The method of claim 1, wherein the ceramic catalyst support has a composition comprising aluminum titanate, cordierite, and/or silicon carbide.

12. The method of claim 1, wherein the ceramic catalyst support is a cellular ceramic catalyst support.

13. A ceramic catalyst support having a base coating, wherein the base coating comprises an aqueous mixture comprising at least one polyvinyl alcohol homopolymer and at least one blocked isocyanate crosslinker chosen from blocked isocyanate crosslinkers capable of crosslinking the polyvinyl alcohol homopolymer.

14. The ceramic catalyst support of claim 13, wherein the base coating is a passivating coating.

15. The ceramic catalyst support of claim 13, wherein the amount of the at least one polyvinyl alcohol homopolymer in the base coating ranges from about 50 wt. % to about 99 wt. % of total polymer solids in the base coating.

16. The ceramic catalyst support of claim 13, wherein the amount of the at least one blocked isocyanate crosslinker in the base coating ranges from about 1 wt. % to about 50 wt. % of total polymer solids in the base coating.

17. The ceramic catalyst support of claim 13, wherein the base coating is substantially free of at least one of calcium, potassium, silicon, fluorine, phosphorous, chlorine, bromine, iron, and sulfur.

18. The ceramic catalyst support of claim 13, wherein the ceramic catalyst support has a composition comprising aluminum titanate, cordierite, and/or silicon carbide.

19. The ceramic catalyst support of claim 13, wherein less than about 20 wt. % of the base coating is extracted from the ceramic catalyst support after soaking the ceramic catalyst support in pH 1.5 acetic acid solution for 24 hours.

20. The ceramic catalyst support of claim 13, wherein the base coating substantially resists wrinkling after soaking the ceramic catalyst support in pH 1.5 acetic acid solution for at least 1 hour.

* * * * *